United States Patent
Andersen et al.

(10) Patent No.: US 8,261,127 B2
(45) Date of Patent: Sep. 4, 2012

(54) SUMMARIZING SYSTEM STATUS IN COMPLEX MODELS

(75) Inventors: Janet S. Andersen, Apex, NC (US); Scott B. Greer, Cary, NC (US); Rosalind Radcliffe, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 12/466,729

(22) Filed: May 15, 2009

(65) Prior Publication Data

US 2010/0293208 A1 Nov. 18, 2010

(51) Int. Cl.
*G06F 11/07* (2006.01)
*G06F 11/30* (2006.01)

(52) U.S. Cl. .......................... 714/25; 714/48

(58) Field of Classification Search .............. None
See application file for complete search history.

(56) References Cited

U.S. PATENT DOCUMENTS

| | | | |
|---|---|---|---|
| 7,539,907 B1 * | 5/2009 | Johnsen et al. | 714/47.2 |
| 2007/0265811 A1 * | 11/2007 | Chalasani et al. | 703/2 |
| 2008/0134046 A1 * | 6/2008 | Gray et al. | 715/736 |
| 2008/0140448 A1 * | 6/2008 | Hernandez et al. | 705/2 |
| 2008/0244319 A1 * | 10/2008 | Nehab et al. | 714/38 |
| 2009/0313508 A1 * | 12/2009 | Yan et al. | 714/47 |

* cited by examiner

*Primary Examiner* — Hosain Alam
*Assistant Examiner* — Sangwoo Ahn
(74) *Attorney, Agent, or Firm* — Jordan IP Law, PC

(57) ABSTRACT

A system and method of characterizing the status of a complex system provide for determining a combined status level of a pair of related objects in an architecture, wherein one of the pair of related objects is a destination object and another of the pair of related objects is a source object. The combined status level determination can be cascaded through the architecture toward a front-end object corresponding to the pair of related objects to obtain a set of combined status levels. A status output may also be generated based on the set of combined status levels.

22 Claims, 9 Drawing Sheets

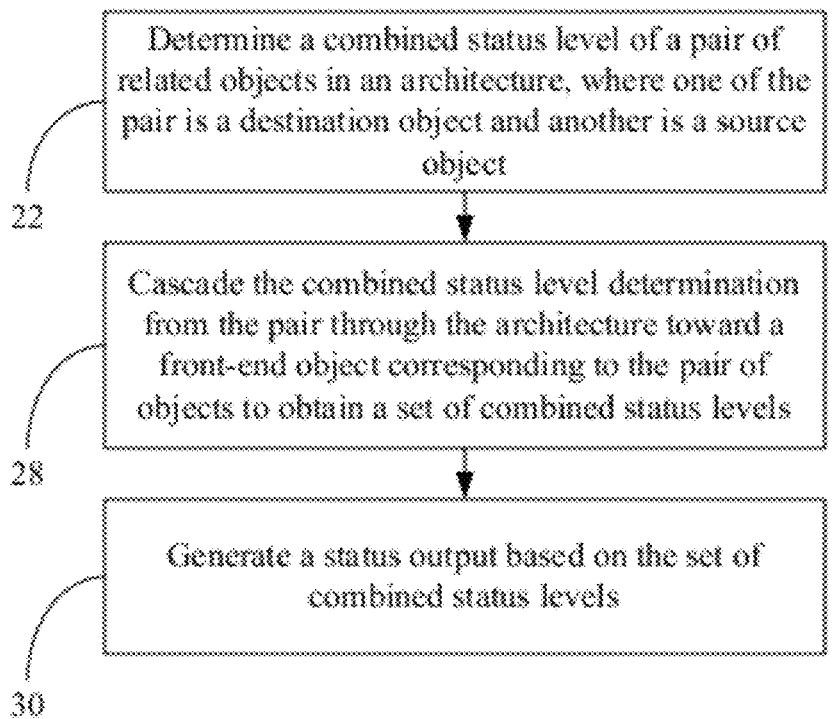
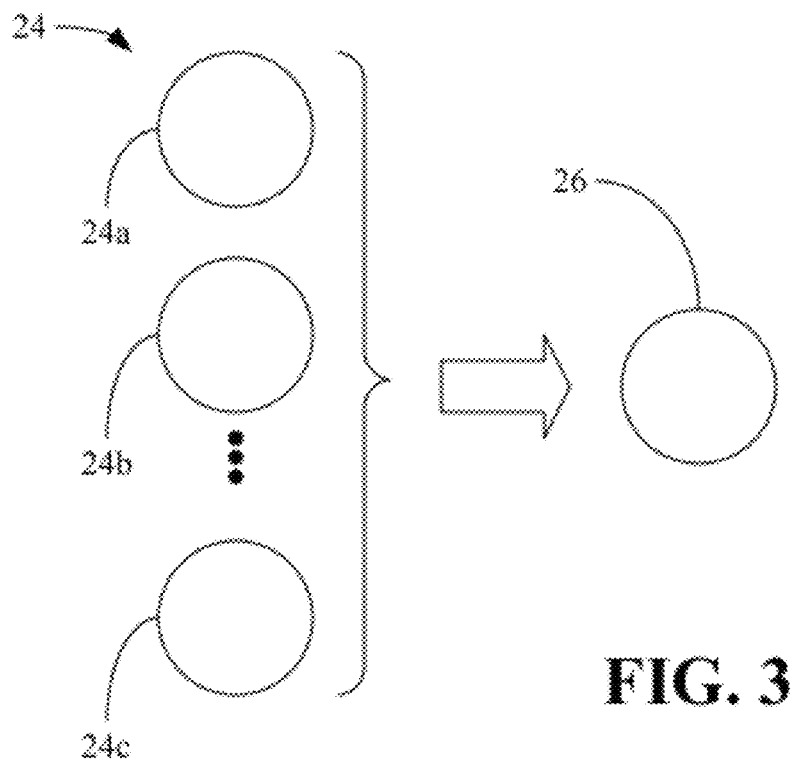

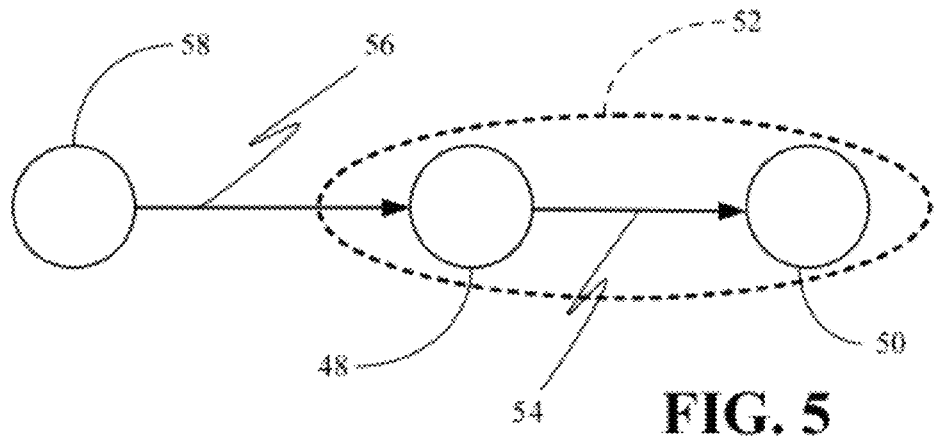
FIG. 5
FIG. 6
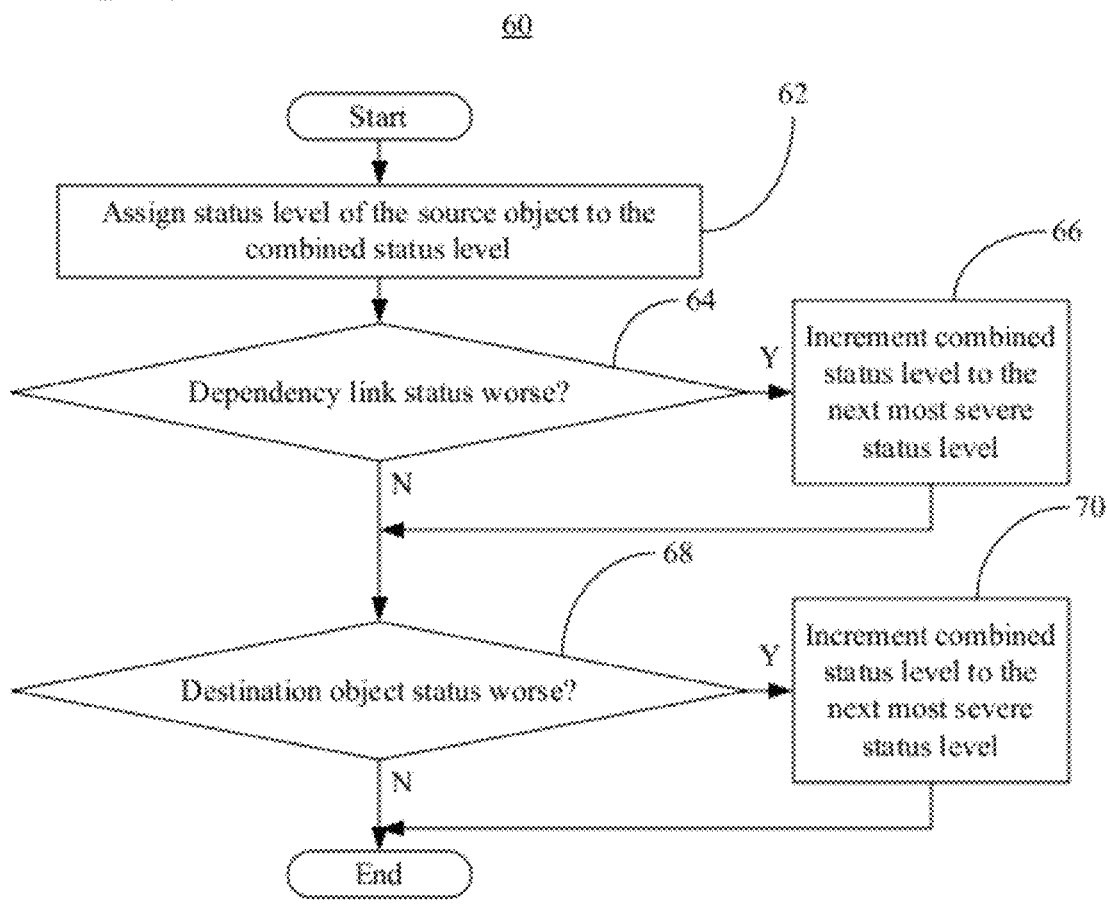

FIG. 9
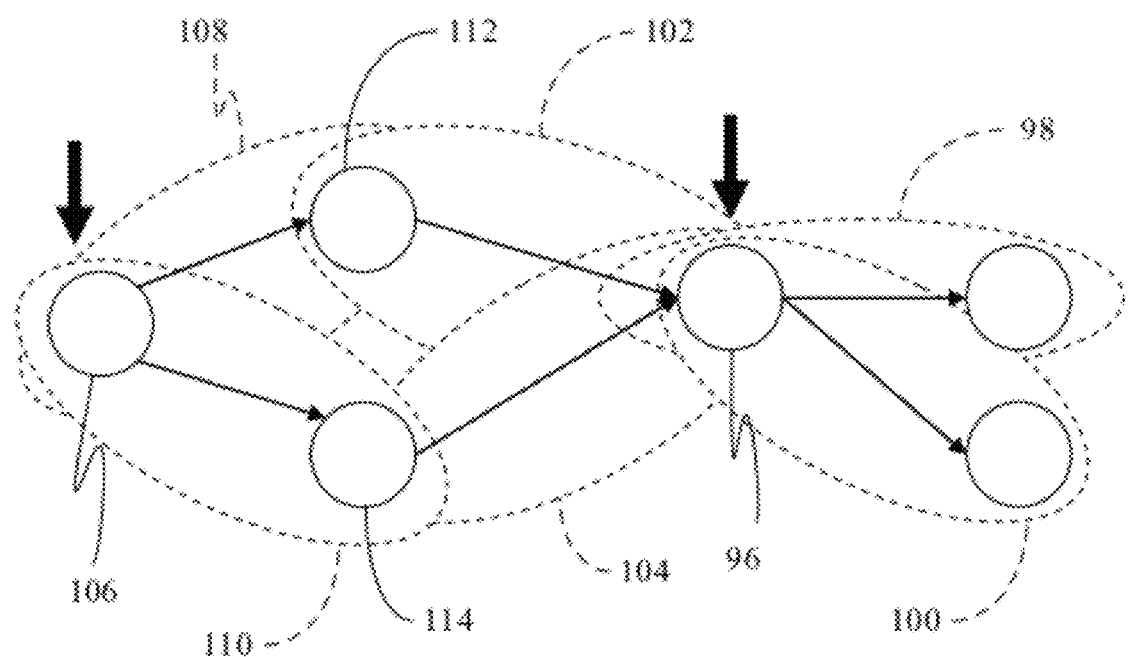
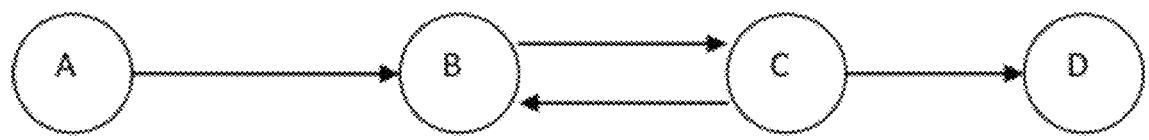
FIG. 10

SUMMARIZING SYSTEM STATUS IN COMPLEX MODELS

BACKGROUND

1. Technical Field

Embodiments of the present invention generally relate to systems management. More particularly, embodiments of the invention relate to the use of a cascaded approach to characterize the status of high-order elements of a complex system.

2. Discussion

The operational status of managed resources in an information technology (IT) system has historically been projected onto the abstract business-level functions in various ways. Usually, this projection might involve some form of status propagation, in which various schemes can be employed to aggregate the status of the IT resources. Perhaps the simplest status propagation approach may be to assign higher-level resources the worst status of its constituents. Although simple to understand and requiring little to no maintenance and configuration, this approach can have a "false positive" impact in which things appear much worse than they really are. False positives may be especially problematic in service-oriented architecture (SOA) systems, which typically have large-scale redundancy. In such a case, an outage of a single deployed SOA service may not represent a problem at all. Worst-status propagation, however, could wrongly indicate that the service is entirely unavailable.

At the other extreme, some status models might require the systems administrator to design, implement, and maintain customized status management rules, which could in turn require complex programming knowledge. Although this approach may have the greatest potential for accurately propagating status, it can come with the considerable—and even prohibitive—expense of being complicated to codify and tedious to maintain as the business function evolves.

Given these two extremes, there may be other solutions to simplify status propagation, but a number of challenges still remain. For example, the concept of "percentage-based thresholding" could be used to allow administrators to essentially define tolerance levels in terms of percentages. For example, an administrator might say that a business process is degraded if more than 50% of its constituent resources are degraded. This approach, however, may have much of the tedium associated with rules-based approach while sometimes resulting in vague or even misleading results. Indeed, false positives could be just as common with such an approach. Simply put, the difficulty with all of these potential approaches is that the premise on which they are based may be flawed—although the operational status of a particular resource may be important, simply propagating its operational state onto business functions that use that resource could conflate operational state at the IT resource level with the functional state at the business level.

BRIEF SUMMARY

Embodiments of the present invention provide for a computer-implemented method that involves determining a combined status level of a pair of related objects in an architecture, where one of the pair of related objects is a destination object and another of the pair of related objects is a source object. The combined status level determination can be cascaded from the pair of related objects through the architecture toward a front-end object corresponding to the pair of related objects to obtain a set of combined status levels. A status output may also be generated based on the set of combined status levels and the approach can be repeated for multiple destination objects in the architecture.

Embodiments of the present invention also provide for a computer program product having a computer readable medium and computer usable code stored on the computer readable medium. If executed by a processor, the computer usable code may cause a computer to determine a combined status level of a pair of related objects in an architecture, wherein one of the pair of related objects is to be a destination object and another of the pair of related objects is to be a source object. The combined status level can be cascaded from the pair of related objects through the architecture toward a front-end object corresponding to the pair of related objects to obtain a set of combined status levels. The computer usable code may also be executed to generate a status output based on the set of combined status levels.

Other embodiments of the present invention may also provide for a computer-implemented method that involves aggregating a set of all deployments of a destination service operation in a service-oriented architecture to obtain a destination object. A set of all deployments of a source service operation in the architecture can be aggregated to obtain a source object, where the destination service operation has a dependency link with the source service operation. A status level of the source object may be assigned to a combined status level, where the combined status level can be incremented to a next most severe status level in an aggregate status model if a status level of the dependency link is worse than the combined status level. The combined status level may also be incremented to a next worse status level in the aggregate status model if a status level of the destination object is worse than the combined status level. The method may further provide for cascading the combined status level through the architecture toward a front-end object corresponding to the source and destination objects to obtain a set of combined status levels. A status output can be generated based on the set of combined status levels and a user defined service group.

Other embodiments of the present invention may also provide for a computer program product having a computer readable medium and computer usable code stored on the computer readable medium, where, if executed by a processor, the computer usable code can cause a computer to aggregate a set of all deployments of a destination service operation in a service-oriented architecture to obtain a destination object. A set of all deployments of a source service operation in the architecture may be aggregated to obtain a source object, where the destination service operation is to have a dependency link with the source service operation. If executed, the computer usable code can also cause a computer to assign a status level of the source object to a combined status level and increment the combined status level to a next most severe status level in an aggregate status model if a status level of the dependency link is worse than the combined status level. The combined status level may also be incremented to next most severe level in the aggregate status model if a status level of the destination object is worse than the combined status level. The combined status level can be cascaded through the architecture toward a front-end object corresponding to the source and destination objects to obtain a set of combined status levels. The computer usable code can further be executed to generate a status output based on the set of combined status levels and a user defined service group.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 2 is a flowchart of an example of a method of characterizing a status of a system according to an embodiment of the present invention;

FIG. 3 is a topology diagram of an example of an aggregation of a plurality of service operation deployments into a system object according to an embodiment of the present invention;

FIG. 5 is a topology diagram of an example of a combined status level determination for a pair of related objects according to an embodiment of the present invention;

FIG. 6 is a flowchart of an example of a method of determining a combined status level of a pair of related objects;

FIG. 9 is a topology diagram of an example of a cascading scheme for a combined status level according to an embodiment of the present invention;

FIG. 10 is a topology diagram of an example of a cyclic link according to an embodiment of the present invention;

DETAILED DESCRIPTION

Figure 1:
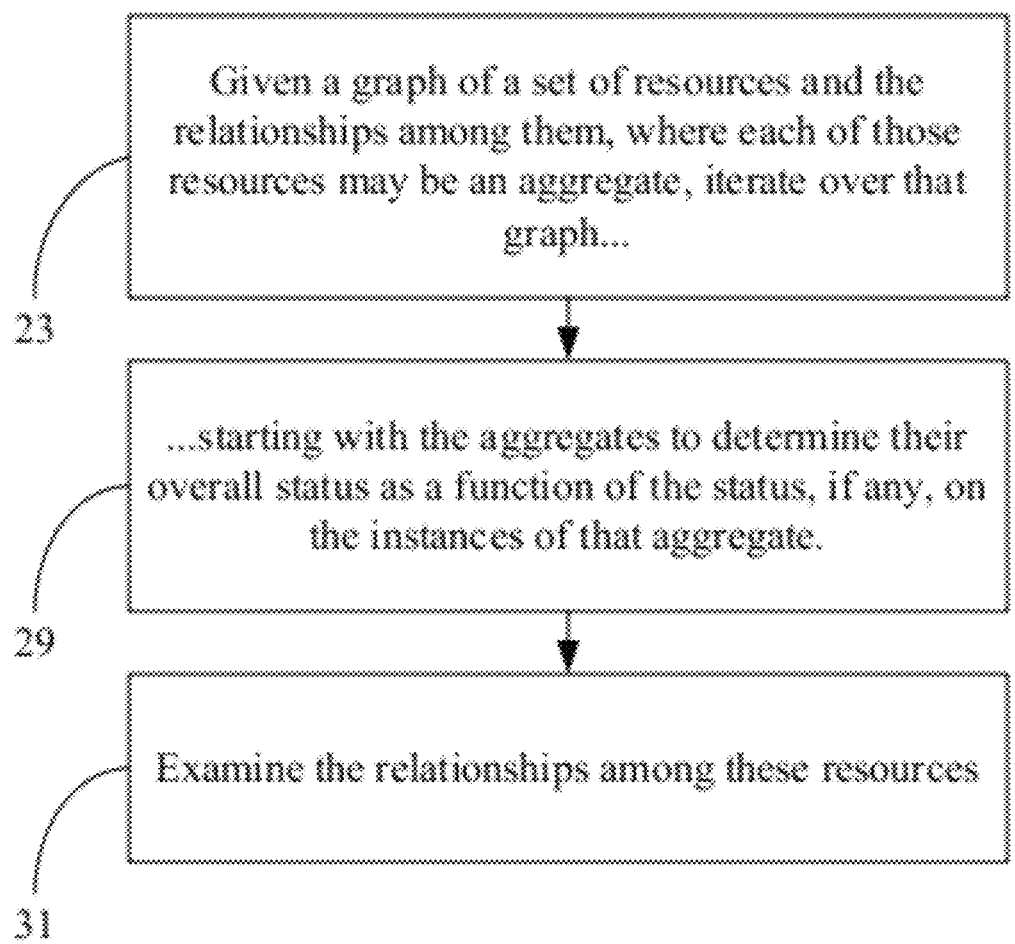
FIG. 1 is a flowchart of an example of a method of analyzing a set of resources according to an embodiment of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more non-transitory computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be punch-card, paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In general, a technique for characterizing the health of a complex system may begin with a topology of objects where there is a relationship (or dependency link) between all or some of the objects. A relationship can be defined in terms of a pair of objects where one object is designated as the source object and the other object, which the source object invokes or depends on, is the destination object. An object that is the source object for one pair relationship may be the destination object for another pair relationship.

Thus, for each object, a status can be calculated. For those objects that represent an aggregation of object instances, the aggregated object status may be calculated using a "rule for sets" heuristic/algorithm, which can take into account the status of each of the instances, the number of instances with the same status value, and a pessimistic bias which may tip the status toward a higher severity status when the number of instances with a higher severity status is less than the number of instances with a lower severity status.

The topology may then be "walked", which involves looking for the most dependent destination objects (i.e., destination objects that are not source objects in other pair relationships). Once these destination objects are found, a "rule for pairs" heuristic can be used to calculate the combined status value, using the status of the source object, the status of the destination object, and the status of the relationship/dependency link between the pair of objects.

At points in the topology where an object is a source object for multiple relationships, the "rule for sets" heuristic can be applied against the combined status values that have been calculated for each of the source object's relationships. The output of that process can be used as the status value for the source object in further calculations.

Next, the combined status value may be cascaded back through the topology to the front-end object(s) by using the "rule for pairs" heuristic to calculate the combined status for each pair of related objects in the path back to the front-end object. If there are multiple front-end objects, the "rule for sets" heuristic can be run against the combined status values for the front-end objects to calculate the status for the overall system.

FIG. 1 shows a method 21 in which processing block 23 provides for iterating over a graph of a set of resources and relationships among them, where each of those resources may be an aggregate. Block 29 provides for starting with the aggregates to determine their overall status as a function of the status, if any, on the instances of that aggregate. The relationships among these resources may be examined in the manner described elsewhere in the present application at block 31.

Referring now to FIG. 2, a method 20 of characterizing the status of a system is shown in which illustrated processing block 22 provides for determining the combined status level of a pair of related objects in an architecture such as a service-oriented architecture (SOA). As will be discussed in greater detail below, each object may represent the aggregation of the set of all deployments of a particular service operation. For example, one object may be defined as all deployments of a customer lookup service, whereas another object might constitute all deployments of an employee lookup service. In the illustrated example, one of the pair of related objects is a destination object and another of the pair of related objects is a source object. Thus, the source object might correspond to a customer lookup service and the destination object could correspond to a customer lookup service to a particular database. The combined status level for many other high-level service operations such as business to business (B2B) operations, human resources operations, customer relationship management (CRM) operations, facilities operations, retail operations, supply chain operations, and other service operations, may be determined in the above fashion.

Illustrated block 28 provides for cascading the combined status level determination from the pair of related objects through the architecture toward a front-end object corresponding to the pair of related objects to obtain a set of combined status levels. A front-end object may be any object that is not a destination object for the pairs of related objects whose status is being evaluated. Thus, each object in the business service flow may be assigned an operational status that represents a functional state reaching back from that point in the flow to its most dependent destination object. A status output may be generated at block 30 based on the set of combined status levels. The illustrated determining, cascading and generating may be repeated for each destination object in the architecture to obtain a full assessment of the SOA involved. The illustrated approach of cascading a combined status level determination through a high-level topology provides a structured technique to systems management that is neither overly simplistic nor unnecessarily complex.

With regard to the aggregation procedure, FIG. 3 demonstrates that a set of deployments 24 (24a-24n) of a service operation can be aggregated into an object 26, where the resulting object 26 may undergo a status evaluation as already discussed. As shown, a highly complex architecture with many deployments of the same or different operations may be readily accommodated with the illustrated approach.

Figure 4:
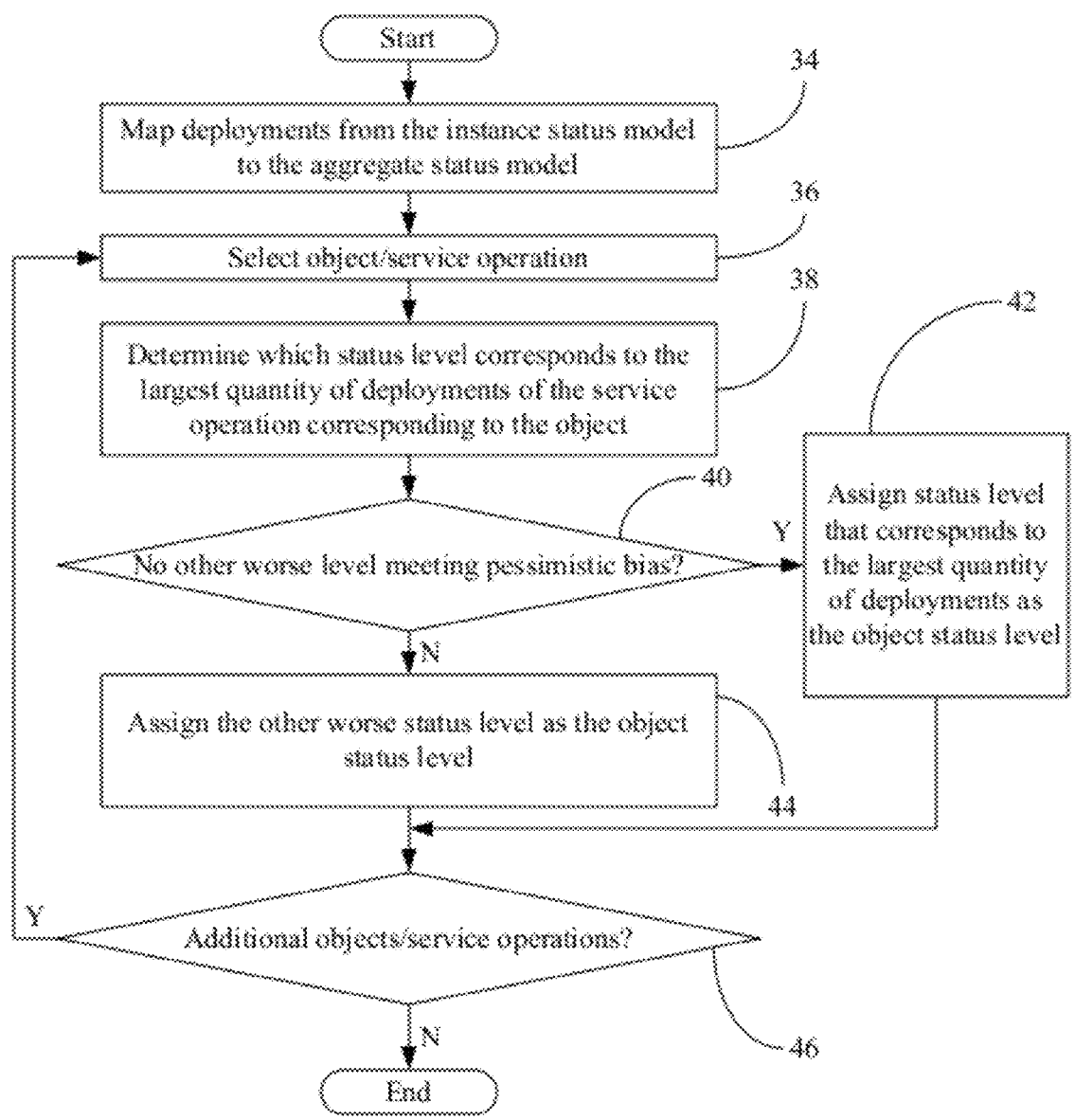
FIG. 4 is a flowchart of an example of a method of aggregating service operation deployments into system objects according to an embodiment of the present invention.

Turning now to FIG. 4, a method 32 of aggregating service operation deployments is shown. In the illustrated example, block 34 provides for mapping service operation deployments from an instance status model to an aggregate status model, which may be a subset of the instance status model. In this regard, operation instances/deployments can reflect the status of the events associated with them (e.g., operation instances/deployments can reflect the status of the events open against them). Service groups, which are described in greater detail below, can also use an aggregate status model such as the model reflected in Table 1.

TABLE 1

| Instance Status Model | Simplified Aggregate/Service Group Status Model |
|---|---|
| ⬢Fatal | ⬢Fatal |
| ⬢Critical | ⬢Critical |
| ⚠Minor | ⚠Warning |
| ⚠Warning | |
| ⬢Harmless | (Normal) |
| ⓘInformational (Normal) | |
| ◉Unknown | ◉Unknown |

This status model is shown only to facilitate discussion, and the model may include more or less status severities than those listed. In the above example, the "Normal" status level in the instance status model should be below (i.e., less severe than) the "Unknown" status level, but Table 1 is better organized in the order shown. Moreover, in some architectures, the "Unknown" status level may have special semantics: in addition to possibly reflecting the Unknown situation status, it can also reflect the offline state of the operation instances. This nomenclature may apply to both the Aggregate and Group levels the illustrated model, and facilitates a simplified functional status model geared towards triage.

An object can be selected at block 36, where illustrated block 38 provides for determining which status level in the aggregate status model corresponds to the largest quantity (i.e., plurality) of deployments of the service operation corresponding to the selected object. If it is determined at block

40 that no other worse status level of the remaining deployments meets a pessimistic bias criterion, the status level that corresponds to the largest quantity of deployments may be assigned as the object status level at block 42. The general idea behind the pessimistic bias can be that when a status falls somewhere between two severities (e.g., "Warning" and "Critical"), pessimistic bias may provide a threshold by which things can be characterized by the more degraded status. Thus, the simplified status model can be geared towards triage and therefore may "round up" when attempting to characterize the status of aggregates and groups—this approach could employ a "pessimistic bias" criterion. The pessimistic bias criterion could represent a percentage of the current plurality (as the various statuses are being evaluated) that a given status level's instance count must be within in order for the object status level to "tip over" to that more serious status level. For example, if a plurality of five has the code so far thinking the status level would be "Warning", but the aggregate also has three instances that are "Fatal", then the pessimistic bias can tip the object status level over to Fatal.

If it is determined at block 40 that there is another worse level meeting the pessimistic bias criterion, illustrated block 44 provides for assigning the other worse status level as the object status level. Block 46 provides for iterating through each object. This aggregation technique may generally be referred to as the application of a "rules for sets" heuristic. In pseudo-code, the technique could be represented as follows:

Given a set of resources that are constituents of a higher-order system, and their operational status, determine the status based on Plurality

```
=>Set current_plurality = 0
=>Set status = ST_NORMAL
=>Given PESSIMISTIC_BIAS = 0.5
=>Iterate over the Simplified Status model from Unknown
up to Fatal
=>=>If the instance count for this simplified status is
=>=>=>non-zero
=>=>=>and greater than the current_plurality
=>=>=>OR (PESSIMISTIC_BIAS <=
=> => => ( instance count for this status / current_plurality )
=>=>then
=>=>=>status = this status
=>=>=>current_plurality = this status's instance count
Finally, see if we can characterize this set as being Normal
=>If the Normal instance count is more than half of the aggregate's
total instances
       =>AND if ((current_plurality is zero) OR
(PESSIMISTIC_BIAS <= (current_plurality /
normal instance count )
       =>Then
       =>=>Set status = ST_NORMAL
```

FIG. 5 shows a topology in which a source object 48 and a destination object 50 constitute a pair 52 of related objects. In the illustrated example, the destination object 50 has a dependency link 54 (e.g., relationship) with the source object 48. Similarly, the source object 48 may have a dependency link 56 with another object 58, so that the source object 48 can be considered to be a destination object with respect to the other object 58. Each object 48, 50, 58 may have a corresponding status that can be determined according to the "rules for sets" aggregation approach already described. The dependency links 54, 56 may also have statuses associated with them. As also already discussed, a combined status level can be determined for the pair 52 of related objects, where that combined status level is cascaded from the pair 52 toward the front-end object (i.e., to and/or through the other object 58). In such a case, the combined status value for the pair 52 can be used as the destination object status when calculating the combined status value for object 58, dependency link 56, and pair 52. Thus, the strategy is to iterate "backwards" through the flow, cascading the combined status of each pair into the next preceding pair.

Given that there is a directional relationship among a pair items, the combined status level could therefore be a function of the status on the source, the link itself, and the destination. The combined status level may also reflect the fact that the status level of the source can have an implicitly greater weight on the combined status. For example, if the source status level is "Normal" but the destination status level is "Fatal", then the combined status level, while non-normal, might not simply be "Fatal", because the client service could appear to be functioning nominally based on its status, as defined by the administrator.

Accordingly, FIG. 6 shows a method 60 of determining a combined status level of a pair of related objects having a source object and a destination object. In the illustrated example, the status level of the source object is assigned to the combined status level at block 62, and block 64 provides for determining whether a the status level of the dependency link between the two objects is worse than the current combined status level. If so, the combined status level may be incremented to the next most severe status level in the aggregate status model at block 66. Illustrated block 68 determines whether the status level of the destination object is worse than the current combined status level. If so, the combined status level may again be incremented to the next most severe status level at block 70. Thus, the illustrated approach starts with the aggregated status level of the source operation and then conducts a series of "incremental cascades" to progressively more severe status levels based on the aggregated status level of the destination operation. This technique, which may be considered a "rules for pairs" heuristic, can be more clearly in pseudo-code as,

```
Given the status of the source and the destination
       Status = status of the source
       If the dependency link has status and the relationship status
is worse than our status so far, then
       =>If the next most severe status is Unknown AND the
relationship status is not Unknown then
       =>=>Status = Warning // skip Unknown
       =>Else
       =>=>Status = the next most severe status    // i.e.,
       "increment" the status.
       If the status of the destination is worse than our status so far, then
       =>If the next most severe status is Unknown AND the
destination status is not Unknown then
       =>=>Status = Warning // skip Unknown
       =>Else
       =>=>Status = the next most severe status    // i.e.,
       "increment" the status.
```

Figure 7:
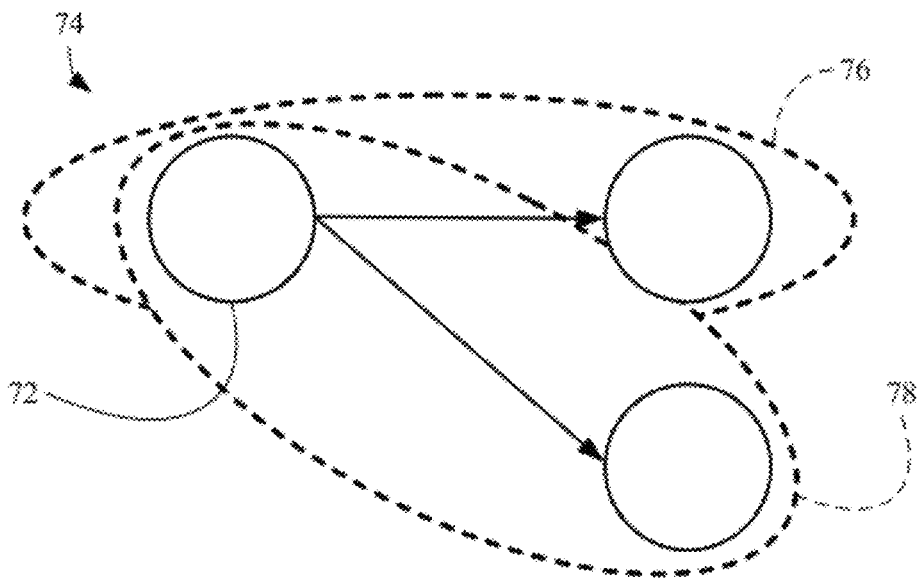
FIG. 7 is a topology diagram of an example of a combined status level determination for an object shared by multiple pairs of objects according to an embodiment of the present invention.

Turning now to FIG. 7, a topology 74 is shown in which an object 72 is shared by multiple pairs 76, 78 of objects. Essentially, each pair's status level can be treated as a "dependent pair" and have its combined status determined according to the "rules for pairs" heuristic already discussed. The result is two different status levels—one status level for pair 76 and one status level for pair 78—where the two status levels may be then summarized into an overall composite status using the "rules for set" heuristic already described. Such a strategy could apply regardless of the number of branches in the fork.

Figure 8:
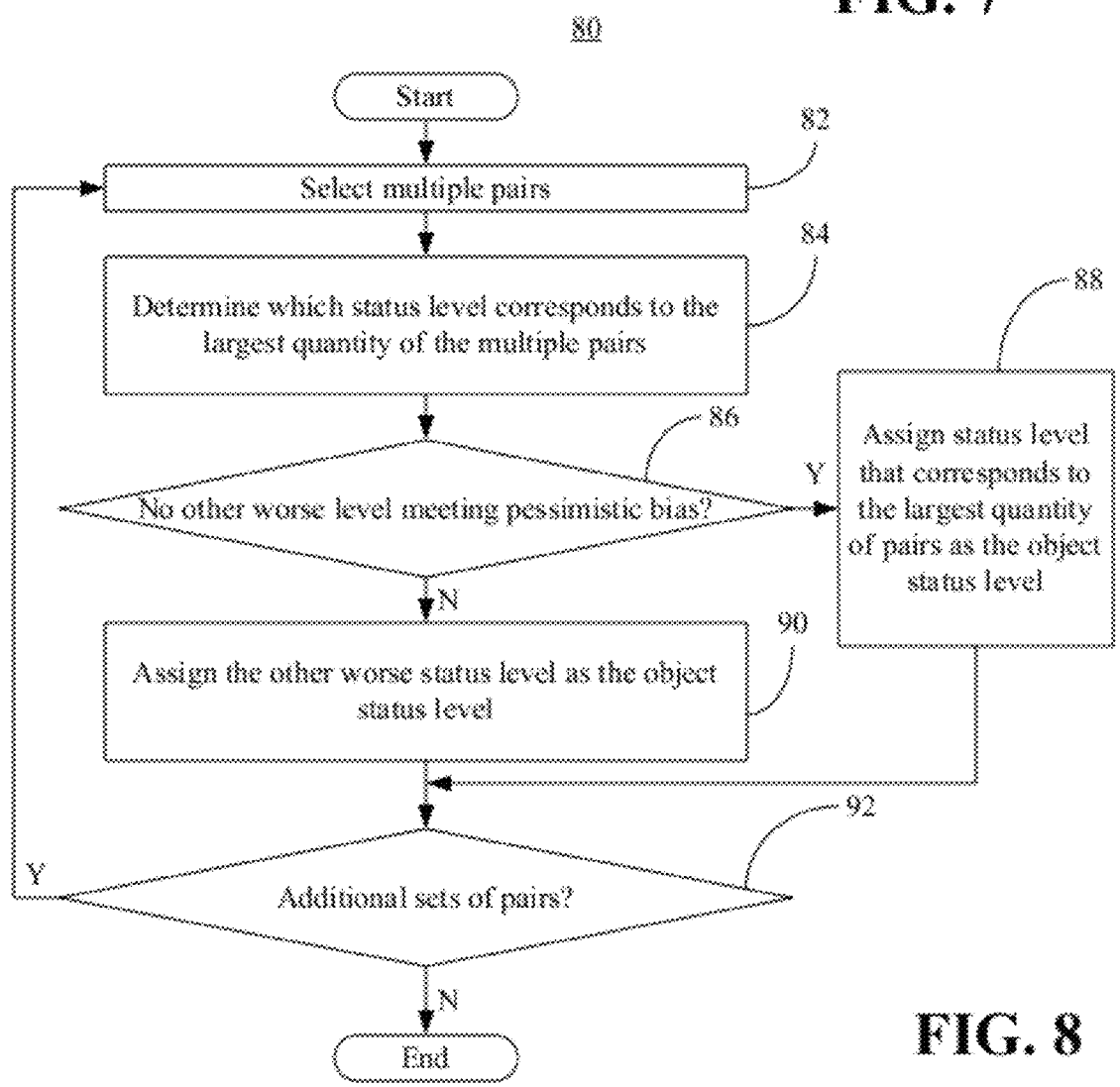
FIG. 8 is a flowchart of an example of a method of determining a combined status level of an object shared by multiple pairs of objects according to an embodiment of the present invention.

FIG. 8 shows a method 80 of determining a combined status level of an object shared by multiple pairs of objects. In the illustrated example, block 82 provides for selecting a set of multiple pairs of objects that share an object. Block 84 may determine which status level in the aggregate status model corresponds to the largest quantity (e.g., plurality) of the multiple pairs. If it is determined at block 86 that no other worse status level meets the pessimistic bias criterion, block 88 may provide for assigning the status level that corresponds to the largest quantity of the multiple pairs as the combined status level. Otherwise, illustrated block 90 provides for assigning the other worse status level that meets the pessimistic bias criterion as the combined status level. Block 92 may provide for iterating through additional sets of pairs.

FIG. 9 shows a topology 94 having a more complex structure. In particular, the illustrated object 96 is a source object for pairs 98 and 100, and is a destination object for pairs 102 and 104. Similarly, object 112 is a source object for pair 102 and a destination object for pair 108, object 114 is a source object for pair 104 and a destination object for pair 110, and object 106 is a source object for pairs 108 and 110. In the illustrated example, the dashed circles represent places in which the "rules for pairs" are in force, and the heavy arrows note places in which the "rules for sets" are in effect.

Turning now to FIG. 10, the possibility of cycles or loops occurring is demonstrated in cyclic graph 116. In the illustrated example, the status of the cycle will be calculated by applying the "rules for sets" heuristic to the aggregates in the cycle (but not any relationships among them), and then factoring that resulting status into the rest of the graph using the other rules already discussed. The calculation of the status for this set of composite relationships may be performed as follows: (1) Cascaded status for C=Status of dependent pair C→D; (2) Cascaded status for B="Rule for sets" algorithm applied to B's status and the cascaded status for C; (3) Cascaded status for A=Status of dependent pair A→B (where B's status is the cascaded status calculated in the previous step). It is possible that the cycle could occur at the beginning of a service group's flow. In such a case, there may be no clear front-end service. The above technique for cycles, however, can still apply. Using the example flow above, assume B, C, and D are in the service group but A is not. The status of the composite relationships for B, C, and D would be calculated as follows: (1) Cascaded status for C=Status of dependent pair C→D; (2) Status for the flow="Rule for sets" algorithm applied to B's status and the cascaded status for C.

Figure 11:
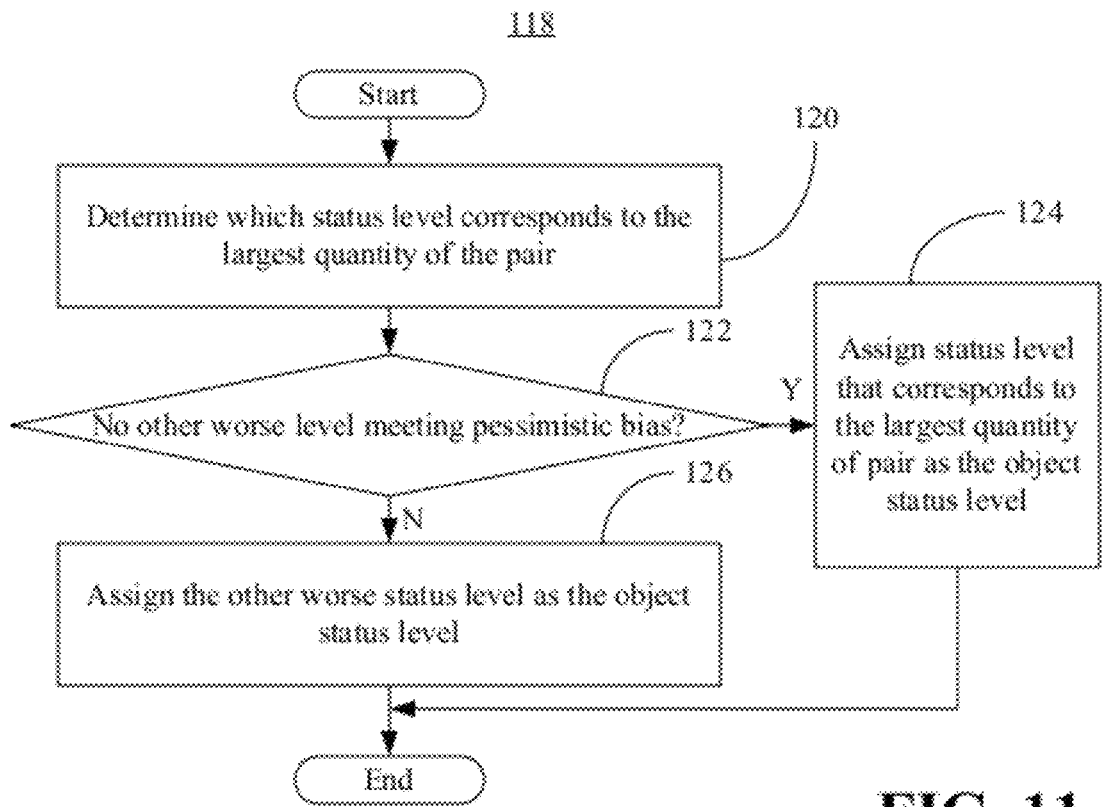
FIG. 11 is a flowchart of an example of a method of determining a combined status level for a pair of objects with a cyclic link.

FIG. 11 shows a method 118 of determining a combined status level for a pair of objects with a cyclic link. Illustrated block 120 determines which status level in the aggregate status model corresponds to the largest quantity (e.g., plurality) of the pair. If it is determined at block 122 that no other worse status level of the remaining objects in the pair meets a pessimistic bias criterion, block 124 may assign the status level that corresponds to the largest quantity of the pair as the combined status level. Otherwise, block 126 provides for assigning the other worse status level as the combined status level.

Figure 12:
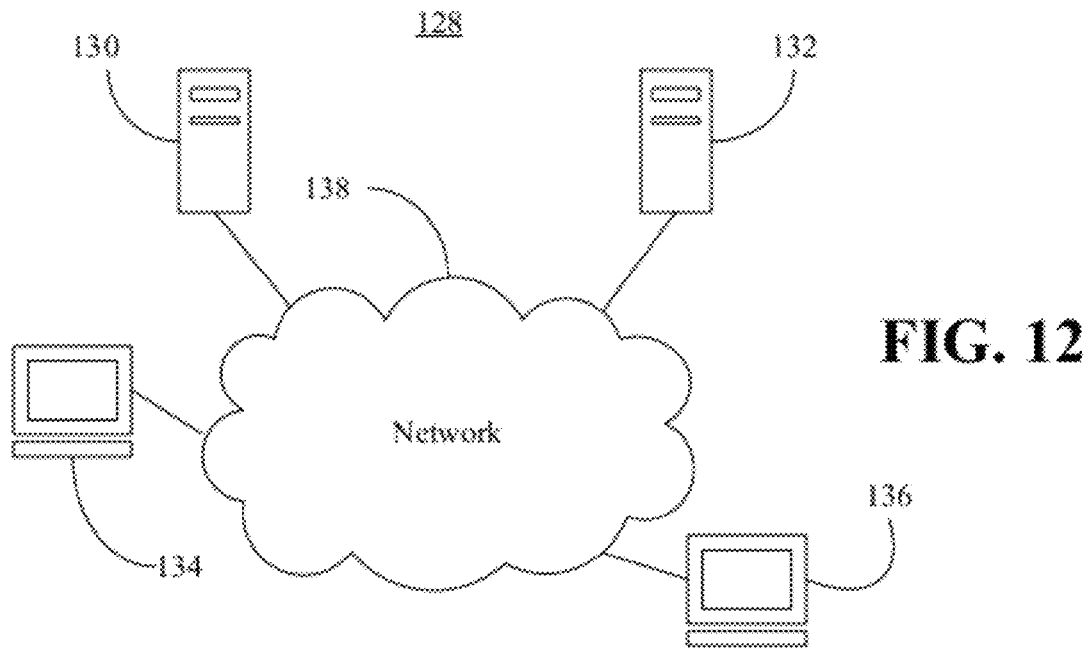
FIG. 12 is a block diagram of an example of a system according to an embodiment of the present invention.

FIG. 12 shows a system 128 with one or more servers 130, 132, and workstations 134, 136, that communicate via a network 138, which may include any suitable combination of servers, access points, routers, base stations, mobile switching centers, public switching telephone network (PSTN) components, etc., to facilitate communication between the servers 130, 132, and workstations 134, 136. The workstations 134, 136, may include any type of user equipment such as a personal computer (PC), laptop, personal digital assistant (PDA), wireless smart phone, and so on. The connection of the user equipment to the network may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. Computer usable code to monitor, manage and/or characterize the status of high-level business flow applications may be configured to run, in a distributed or centralized fashion, on the servers 130, 132, the workstations 134, 136, or any other appropriate computing platform.

Figure 13:
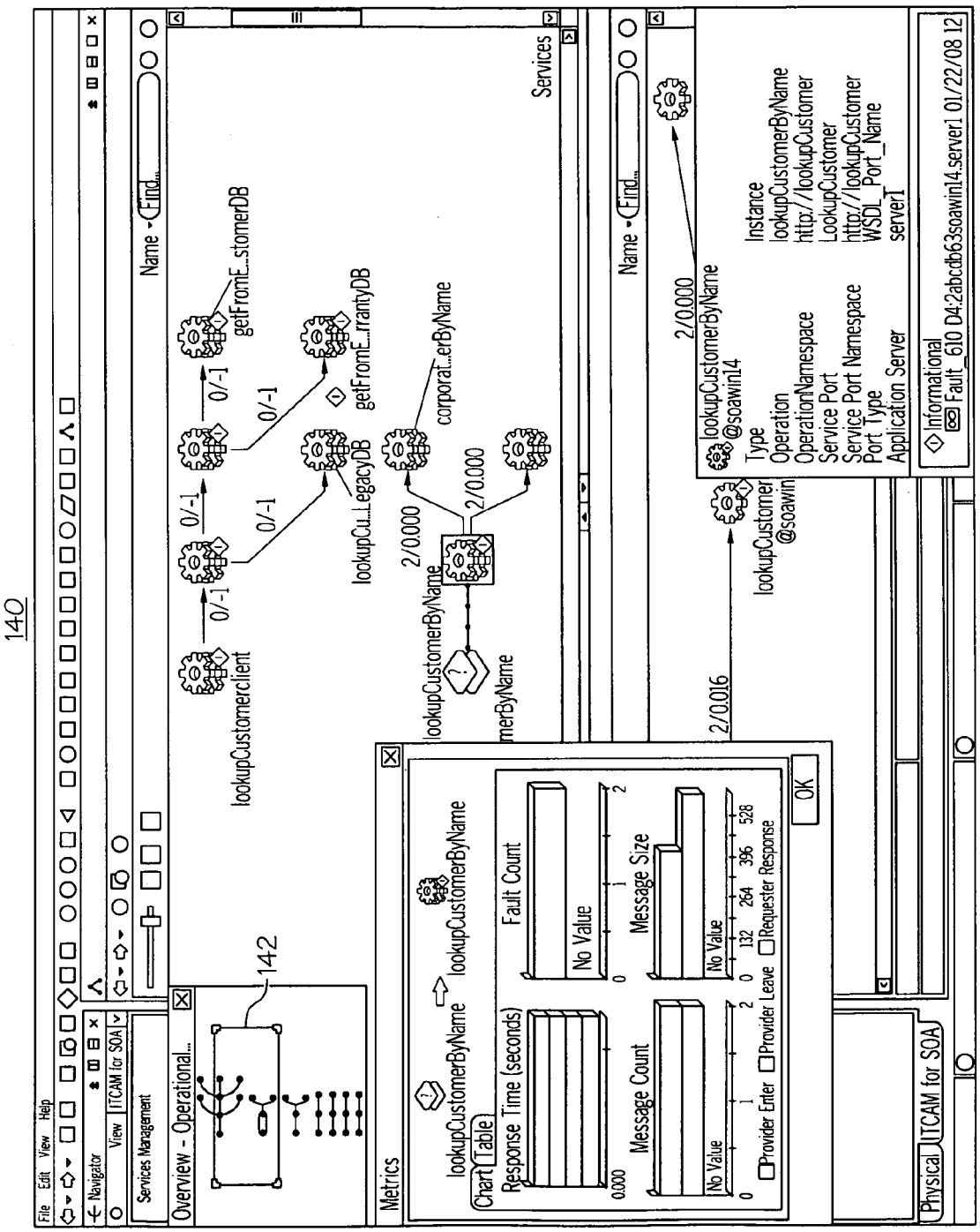
FIG. 13 is a screen shot of an example of a status output according to an embodiment of the present invention.

FIG. 13 demonstrates an example of a status output 140. In the illustrated example, a number of customer lookup processes, along with their status levels, is shown. For example, by drawing a box 142 around a particular portion of the overall architecture, a user could zoom in on the status of services for looking up customers by name and looking up customer clients. In each case, the status level of each aggregated service operation in the flow can be viewed and analyzed.

Another aspect of the techniques described herein provides for service groups, which can be entirely customer-defined collections of operation aggregates. Service groups can encompass one or more service flows, or subsets of flows, or they could simply be an ad hoc container of operation aggregates. Despite this open-endedness and the resulting implications on the complexity of conveying status, however, an approach to derive the group's collective, holistic status is provided. In particular, the service group can be treated as a collection of discrete elements. These elements could be operation aggregates that have no relationships to other aggregates in the service group. Each of these operation aggregates may be considered a front-end object. The elements might also include service flow(s) with one or more front-end objects, or subsets of service flows (i.e., a specific set of aggregates as well as implicitly reflecting the relationships among them) with one or more front-end objects. Service flows may include operation aggregates, where the flow (e.g., call/invocation) from one operation aggregate to another can be a relationship.

The strategies for determining the overall status for each of these different kinds of elements that may comprise a group have already been covered. Summarizing these combined status levels into the group's status is then a matter of employing the "rules for sets" heuristic described earlier for the front-end services, which in the case of service groups results in one of the aggregate status levels. Groups may start out empty (just after they are created), and a given group may become empty again either as the user edits the group via a dialog. In extreme cases, it is may also be possible for a group to become empty again if all the instances of all of its aggregates are deleted. Although there is some rationale for indicating this last scenario in status, e.g., as Unknown, this state of the group has not been conflated with the aggregate status model. Instead an empty group can have a status of Normal.

Thus, the above approach may actually be determining the status of a service group's front-end service by analyzing the full path of the flow starting from the front-end service and following all call paths that go through other members of the service group. As a result, it can apply whether or not the "front-end" for a service group is actually the "front-end" for a particular service flow.

Figure 14:
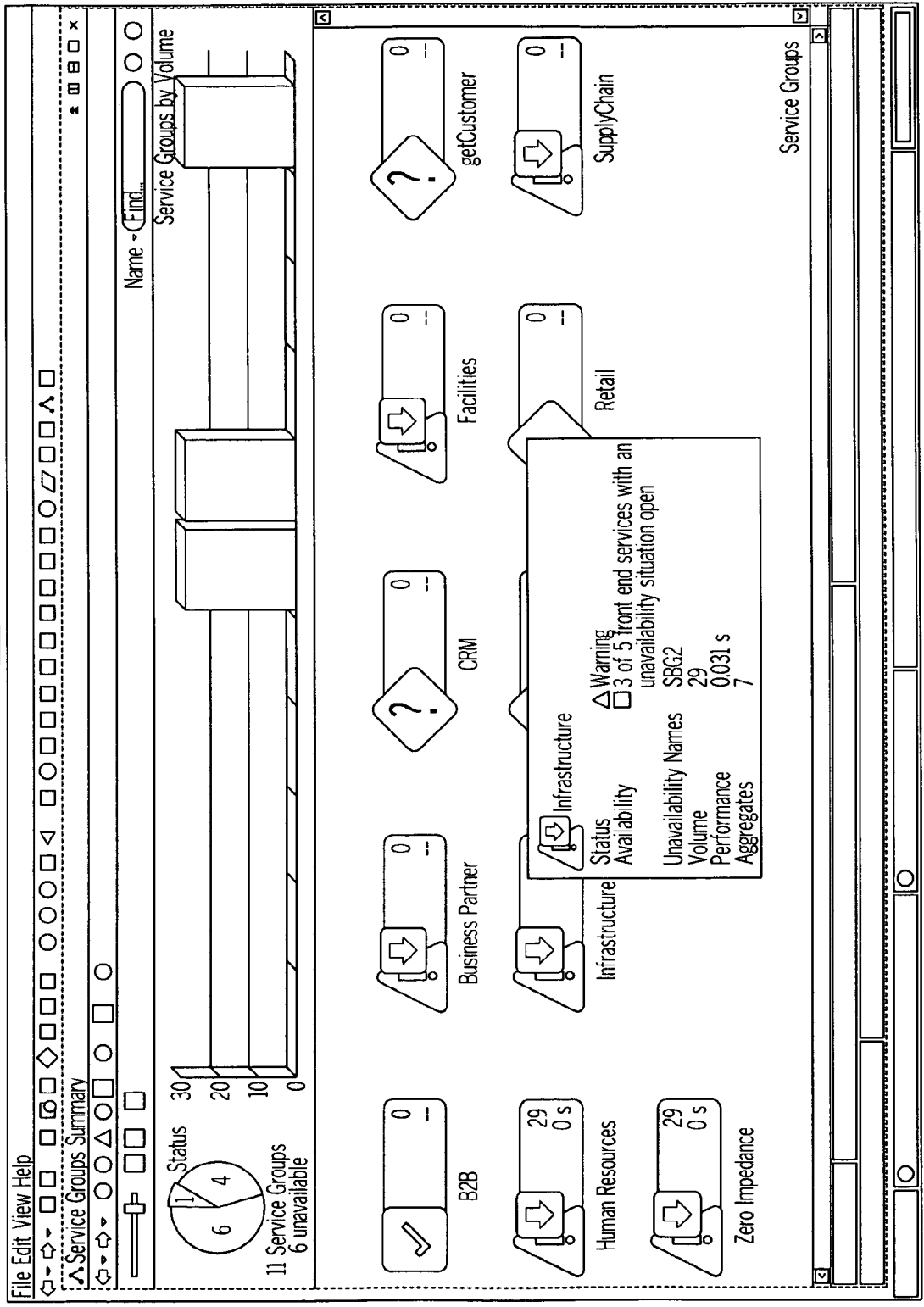
FIG. 14 is a screen shot of an example of a status summary for plurality of user defined service groups according to an embodiment of the present invention.

FIG. 14 shows an example of a user interface for determining the status of service groups such as B2B, human resources and CRM service groups. Generic applications of the above-described status model could also be capable of handling containers of arbitrary objects which themselves may have status. In fact, this would work exactly the way we have handled service groups, since these are basically containers. Given their complexity, service groups illustrate the way in which embodiments of the present invention apply "rules for sets" and "rules for pairs" to derive the status of business-level constructs based on the observed status of its lower-level components, even across complex service flows. As a result of the techniques described herein, users can obtain operational status from the moment the management infrastructure first begins generating status events at the operational level; configuration and maintenance can be totally obviated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer-implemented method comprising:
   determining a combined status level of a pair of related objects in a software architecture, wherein one of the pair of related objects is a destination object and another of the pair of related objects is a source object, wherein the determining includes:
   assigning a status level of the source object to the combined status level, and
   incrementing the combined status level to a next most severe status level in an aggregate status model based on a status level of a dependency link between the pair of objects being worse than the combined status level;
   cascading the combined status level determination from the pair of related objects through the software architecture toward a front-end object corresponding to the pair of related objects to obtain a set of combined status levels; and
   generating a status output associated with the front-end object based on the set of combined status levels.

2. The method of claim 1, wherein the determining further includes:
   incrementing the combined status level to a next most severe status level in the aggregate status model based on a status level of the destination object being worse than the combined status level.

3. The method of claim 2, wherein the aggregate status model is a subset of and maps to an instance status model for the architecture.

4. The method of claim 1, further including:
   defining each object as an aggregation of a set of all deployments of a particular service operation; and
   applying a rules for sets heuristic to each object.

5. The method of claim 4, wherein applying the rules for sets heuristic to each object includes:
   determining which status level corresponds to a largest quantity of deployments of a service operation corresponding to the object;
   assigning the status level that corresponds to the largest quantity of deployments as an object status level based on no other worse status level of remaining deployments meets a pessimistic bias criterion; and
   assigning the other worse status level as the object status level based on the other worse status level meeting the pessimistic bias criterion.

6. The method of claim 1, wherein based on the pair of related objects including an object shared by multiple pairs of objects, the method further includes:
   determining which status level corresponds to a largest quantity of the multiple pairs;
   assigning the status level that corresponds to the largest quantity as the combined status level based on no other worse status level of remaining pairs meeting a pessimistic bias criterion; and
   assigning the other worse status level as the combined status level based on the other worse status level meeting the pessimistic bias criterion.

7. The method of claim 1, wherein, based on the pair of related objects includes a cyclic link, the method further includes:
   determining which status level corresponds to a largest quantity of the pair;
   assigning the status level that corresponds to the largest quantity of the pair as the combined status level based on no other worse status level of remaining objects in the pair meeting a pessimistic bias criterion; and
   assigning the other worse status level as the combined status level based on the other worse status level meeting the pessimistic bias criterion.

8. The method of claim 1, wherein the generating includes generating the status output based on a user defined service group.

9. The method of claim 1, wherein the architecture includes a service-oriented architecture.

10. A computer program product comprising:
    a non-transitory computer readable medium; and
    computer usable code stored on the non-transitory computer readable medium, where, when executed by a processor, the computer usable code causes a computer to:
    determine a combined status level of a pair of related objects in an architecture, wherein one of the pair of related objects is to be a destination object and another of the pair of related objects is to be a source object;
    assign a status level of the source object to the combined status level;
    increment the combined status level to a next most severe status level in an aggregate status model based on a status level of a dependency link between the pair of objects being worse than the combined status level;
    cascade the combined status level from the pair of related objects through the architecture toward a front-end object corresponding to the pair of related objects to obtain a set of combined status levels; and generate a status output based on the set of combined status levels.

11. The computer program product of claim 10, wherein the computer usable code, when executed, causes a computer to:
increment the combined status level to a next most severe status level in the aggregate status model based on a status level of the destination object is worse than the combined status level.

12. The computer program product of claim 11, wherein the aggregate status model is a subset of and maps to an instance status model for the architecture.

13. The computer program product of claim 10, wherein the computer usable code, when executed, further causes a computer to:
define each object as an aggregation of a set of all deployments of a particular service operation; and
apply a rules for sets heuristic to each object.

14. The computer program product of claim 13, wherein for each object, the computer usable code, when executed, causes a computer to:
determine which status level corresponds to a largest quantity of deployments of a service operation corresponding to the object;
assign the status level that corresponds to the largest quantity of deployments as an object status level based on no other worse status level of remaining deployments meeting a pessimistic bias criterion; and
assign the other worse status level as the object status level based on the other worse status level meeting the pessimistic bias criterion.

15. The computer program product of claim 10, wherein based on the pair of related objects includes an object shared by multiple pairs of objects, the computer usable code, when executed, further causes a computer to:
determine which status level corresponds to a largest quantity of the multiple pairs;
assign the status level that corresponds to the largest quantity as the combined status level based on no other worse status level of remaining pairs meeting a pessimistic bias criterion; and
assign the other worse status level as the combined status level based on the other worse status level meeting the pessimistic bias criterion.

16. The computer program product of claim 10, wherein, based on the pair of related objects including a cyclic link, the computer usable code, when executed, further causes a computer to:
determine which status level corresponds to a largest quantity of the pair;
assign the status level that corresponds to the largest quantity of the pair as the combined status level based on no other worse status level of remaining objects in the pair meeting a pessimistic bias criterion; and
assign the other worse status level as the combined status level based on the other worse status level meeting the pessimistic bias criterion.

17. The computer program product of claim 10, wherein the computer usable code, when executed, further causes a computer to generate the topology output based on a user defined service group.

18. The computer program product of claim 10, wherein the architecture is to include a service-oriented architecture.

19. A computer-implemented method comprising:
aggregating a set of all deployments of a destination service operation in a service-oriented software architecture to obtain a destination object;
aggregating a set of all deployments of a source service operation in the architecture to obtain a source object, wherein the destination service operation has a dependency link with the source service operation;
assigning a status level of the source object to a combined status level;
incrementing the combined status level to a next most severe status level in an aggregate status model based on a status level of the dependency link being worse than the combined status level;
incrementing the combined status level to a next most severe status level in the aggregate status model based on a status level of the destination object being worse than the combined status level;
cascading the combined status level through the service-oriented software architecture toward a front-end object corresponding to the source and destination objects to obtain a set of combined status levels; and
generating a status output based on the set of combined status levels and a user defined service group.

20. The method of claim 19, wherein for each object, the aggregating includes:
determining which status level corresponds to a largest quantity of deployments of a service operation corresponding to the object;
assigning the status level that corresponds to the largest quantity of deployments as an object status level based on no other worse status level of remaining deployments meets a pessimistic bias criterion; and
assigning the other worse status level as the object status level based on the other worse status level meeting the pessimistic bias criterion, wherein the pessimistic bias criterion is a simple majority of the largest quantity of deployments.

21. A computer program product comprising:
a non-transitory computer readable medium; and
computer usable code stored on the non-transitory computer readable medium, where, when executed by a processor, the computer usable code causes a computer to:
aggregate a set of all deployments of a destination service operation in a service-oriented architecture to obtain a destination object;
aggregate a set of all deployments of a source service operation in the architecture to obtain a source object, wherein the destination service operation is to have a dependency link with the source service operation;
assign a status level of the source object to a combined status level;
increment the combined status level to a next most severe status level in an aggregate status model based on a status level of the dependency link being worse than the combined status level;
increment the combined status level to a next most severe status level in the aggregate status model based on a status level of the destination object being worse than the combined status level;
cascading the combined status level through the architecture toward a front-end object corresponding to the source and destination objects to obtain a set of combined status levels; and
generate a status output based on the set of combined status levels and a user defined service group.

22. The computer program product of claim 21, wherein for each object, computer usable code, when executed, further causes a computer to:

determine which status level corresponds to a largest quantity of deployments of a service operation corresponding to the object;

assign the status level that corresponds to the largest quantity of deployments as an object status level based on no other worse status level of remaining deployments meeting a pessimistic bias criterion; and assign the other worse status level as the object status level based on the other worse status level meeting the pessimistic bias criterion, wherein the pessimistic bias criterion is a simple majority of the largest quantity of deployments.

* * * * *